United States Patent [19]
Ilting et al.

[11] Patent Number: 5,951,666
[45] Date of Patent: Sep. 14, 1999

[54] BUS SYSTEM HAVING BOTH SERIAL AND PARALLEL BUSSES

[75] Inventors: Thomas Ilting, Nuremberg; Jeorg Meissner, Altdorf; Juergen Schubert, Roth, all of Germany

[73] Assignee: Lucent Technologies Inc., Murray Hill, N.J.

[21] Appl. No.: 08/976,758

[22] Filed: Nov. 24, 1997

[30] Foreign Application Priority Data

Nov. 28, 1996 [DE] Germany .......................... 196 49 258

[51] Int. Cl.$^6$ .............................. G06F 13/38; G06F 13/40
[52] U.S. Cl. ............................................ 710/128; 710/129
[58] Field of Search .................................. 395/308, 306, 395/309, 200.83, 891; 341/100, 101; 710/128, 126, 129, 71; 709/253

[56] References Cited

U.S. PATENT DOCUMENTS

| | | | |
|---|---|---|---|
| 4,728,930 | 3/1988 | Grote et al. .............................. | 341/101 |
| 5,475,818 | 12/1995 | Molyneaux et al. ................ | 395/200.83 |
| 5,596,724 | 1/1997 | Mullins et al. .......................... | 395/308 |
| 5,649,124 | 7/1997 | Kreidl ..................................... | 395/306 |
| 5,742,844 | 4/1998 | Feldman .............................. | 395/800.32 |

*Primary Examiner*—Gopal C. Ray

[57] ABSTRACT

The bus system (2) for the transfer of data within a master-slave system (1) comprises a parallel data bus (3) and a serial data bus (4, 5), as well as at least one control line (15, 16) for a control signal (SnP, RnW) determining the manner of transfer, wherein each slave ($S_{1...n}$) can be connected to a data bus (3; 4, 5) corresponding to its interface ($SIF_p$, $SIF_s$) and can be controlled with respect to the manner of transfer. Upon the transfer of both serial data (SD) and parallel data (PD) with the addressing of the or each slave (Sn), a first control signal (serial, not parallel) for the type of transfer is set before a strobe signal (STRB) for the transfer of data is activated. For the determining of a write or read access, a further control signal (RnW) for the direction of transfer (read, not write) is set.

6 Claims, 4 Drawing Sheets

BUS SYSTEM HAVING BOTH SERIAL AND PARALLEL BUSSES

BACKGROUND OF THE INVENTION

1. Field of the Invention

The present invention relates to a bus system for the transfer of data within a master-slave system. It also refers to a method of transmitting, in particular, digital data by means of such a bus system.

2. Description of the Related Art

A bus system serves for the transfer, in particular, of digital data for the setting and/or testing of the state of different functional subunits. For this purpose, the bus system connects the functional subunits together, one of which subunits is a master while the others are slaves (single master bus). The functional subunits or slaves are not only frequently located on different circuit boards but, as a rule, also have interfaces for different types of transfer. Thus, some of the slaves may have an interface for a parallel data transfer, while each of the other slaves has an interface for a serial data transfer. Furthermore, the slaves or their interfaces may be designed for different directions of transfer, i.e. bidirectional or unidirectional and for either write access or read access.

Within a high frequency (HF) transceiver (radio-frequency unit, RFU) of a base station (Base Transceiver Station, BTS) for mobile communication in accordance with the GSM standard (Global Systems for Mobile Communication), each slave however is generally connected via a direct physical connection to the master for the transfer of control and status data, so that the master can write (send) data to each slave and read (receive) data from it. In such a star-shaped structure consisting of point-to-point connections, the master or its controlling processor has a separate interface for each subunit or each slave. This, however, results in a particularly high load on the processor upon regular activating of the different interfaces. Furthermore, the connecting of the slaves to the master is particularly difficult. Changes in individual subunits or an expansion of the system by additional subunits is not possible, or possible only at considerable expense, due to the necessary adaptations within the system.

Upon the use of a parallel data bus, the connecting of a slave having a serial interface requires additional circuits for adaptation to the bus system. Similarly, upon the use of a serial data bus, the connection of a slave with parallel interface requires additional circuits for adaptation to the bus. The use of additional circuits and signal lines results in a considerable expense.

SUMMARY OF THE INVENTION

The object of the present invention is therefore to provide a bus system for the transfer of data within a master-slave system which permits, with the least expense possible, different types of data transfer, with which both serial and parallel data are to be transferred. Furthermore, a corresponding method for transferring of the data is to be indicated.

The bus system has both a parallel data bus and a serial data bus. The bus system furthermore comprises at least one control line for a control signal which determines the manner of transfer, i.e. the type of transfer of the data (serial or parallel) and/or the direction of transfer (read or write). Each slave can then be connected via its special interface to a data bus corresponding to its type of transfer.

A plurality of functional subunits can be participants in a bus of a common bus system, regardless of their interface or type of transfer, if a parallel data bus and a serial data bus can be combined so as to form a bus system. This combination would be capable of being realized in a simple manner if the bus lines necessary for a parallel data bus and a serial data bus are supplemented for a physical connection of the bus participants to each other merely by a number of control lines for controlling the corresponding type of transfer. Thus, in each case only one interface to the bus system would be necessary both for a master and for any number of slaves within a master-slave system. Only the master would have to assume, as additional task, the control of the corresponding manner of transfer with regard to its type and direction during a bus cycle.

For the addressing of the slave or each slave, a parallel address bus having a number of address lines, for instance seven address lines, is advantageously provided. The parallel data bus preferably comprises eight data lines so that, upon digital data transfer eight (8) bits or one (1) byte can be transferred simultaneously. The serial data bus advisedly comprises a control line for a clock signal in addition to a signal line for the serial data. By means of this clock signal, all bits, for instance starting with the highest bit, are counted individually upon a serial transfer of digital data.

In order to be able, from the standpoint of the master, both to read and write data, the bus system, in one suitable embodiment, comprises, in addition to a separate control line for a control signal which determines the type of transfer of the data, also a separate control line for a control signal which determines the direction of transfer of the data within the master-slave system. Within a reading or writing cycle defined by such a control signal for the direction of transfer, another control signal in the form of a separate strobe signal is activated, it being conducted over a further control line of the bus system.

In another suitable embodiment, the bus system has a bus-master interface which is common to all slaves. For a change from one type of transfer to the other type of transfer and thus for the converting of serial data into parallel data and vice versa, the master is advantageously associated with a corresponding converter. This converter can then be connected within the master, via an internal data bus. to a processor of the master. A preferably parallel interface of this processor is then the interface of the master to the bus system. The processor interface uncouples the master and the bus system in such a manner that, on the one hand, the processor can access the bus system with its maximum speed and, on the other hand, the bus system can operate with the lowest possible transfer rate. The processor is therefore not slowed down.

Data can be transferred over the bus system both in serial form and in parallel form. In this connection, the data can, from the standpoint of the master, be both written to the slaves and read by them regardless of the form of transfer of the master, i.e. regardless of whether the data are transferred in serial form or in parallel form. For this purpose, before, after or with an address for each slave, a control signal for the type of transfer (serial, not parallel) is first of all set. Before, at the same time or subsequently, a control signal defining the direction of transfer (read, not write) is set so that then the or each slave addressed for the data transfer is unequivocally determined with respect to the manner of transfer.

If the address signals as well as the control signals which determine the direction of transfer and the type of transfer are stable, then a further control signal or strobe signal is activated. If controls, on the one hand, the preparation of the data on the bus system and, on the other hand, the taking over of the data by the bus system. In this connection, a first, preferably falling edge of the strobe signal is advisedly used for the preparation of the data, while a second edge of the strobe signal which is the inverse of the first edge and follows it after a period of time is used to receive the data.

Upon an access, and in particular a write access, to the serial data bus of the bus system (serial writing cycle), a corresponding clock signal (serial clock) is set. In this connection, upon a serial write cycle, the serial data conducted over the serial bus system are driven by the master. Similarly, upon the serial read cycle, the serial data are driven by the corresponding slave. A corresponding clock signal is generated also upon serial reading.

Upon a read access to the parallel bus system (parallel reading cycle) an address signal as well as control signals for the type of transfer are first of all set, these signals being driven by the master. If these signals are stable, then, for a given period of time, the master activates the strobe signal for the transfer of data from the slave addressed over the bus system to the master. In this connection, the data driven by the slave on the parallel data bus in time before the second rising edge of the strobe signal are valid, so that the master can take over the data with this edge. Thereupon, the slave no longer need drive the parallel data bus, and the master can change the address and start the next bus cycle. In the parallel reading cycle, the clock signal for a serial data access is preferably constant, for instance LOW (logical 0). Also, a constant signal, for instance HIGH (logical 1) or LOW is preferably present on the serial data bus.

Upon a write access to the parallel data bus (parallel writing cycle) and thus to a slave with a parallel interface, corresponding address signals and a control signal for the type of transfer are again first set. Furthermore, a corresponding control signal for the direction of transfer is set, so that a connection is now unequivocally defined between the master and the or each slave addressed over the bus system. If these control signals are stable, then the master again activates the strobe signal for a given period of time for the transfer of data from the master to the slave addressed. After the master has cancelled the strobe signal, it can change the address and start the next bus cycle. In this connection, a parallel or a serial writing cycle is possible. Upon this parallel transfer, the master, after activation of the strobe signal, drives a valid value or a valid datum on the parallel data bus of the bus system. This value or datum advisedly still remains stable for a certain period of time after a deactivation of the strobe signal for the transfer of data so that the slave addressed can take over the data again with the rising edge of the strobe signal. Also in the case of the parallel writing cycle, the clock signal for a serial data access is constant over the entire time of the cycle, for instance LOW. Similarly, a constant signal, for instance HIGH or LOW, is again set on the serial data bus.

Upon the serial writing, the master, during the activating of the strobe signal for the transfer of data, generates a clock signal for a serial data access with preferably eight (8) clock pulses and, in the vicinity of the positive edges thereof, stable values on the data line of the serial data bus. In this connection, the value in the vicinity of the rising edge of the first clock pulse represents preferably the bit of the highest value. Over the entire serial writing cycle, the parallel data bus preferably remains undriven. During a serial data transfer, a constant signal level, for instance HIGH, can be set.

The advantages obtained with the invention consist, in particular, therein that with a bus system built up of a parallel data bus and a serial data bus within a master-slave system, a transfer of both parallel data and serial data is possible. The slaves can be connected to the same bus system, in which connection they can, corresponding to their interface, be connected either to the serial or to the parallel data bus. For the transfer of parallel or serial data, the slaves which can be connected over correspondingly parallel or serial interfaces to the bus system can be controlled in simple manner over the same bus system in accordance with both the corresponding type of transfer and the corresponding direction of transfer, so that, in each bus cycle, only the or each slave addressed and defined with respect to the manner of transfer is activated. With regard to the addressing, the bus system is thus just as simple as a traditional data bus. In contradistinction to a purely serial or purely parallel data bus, this bus system, however, makes possible the connection of many participants who are both functionally different and differ also with respect to the manner of transfer.

Since, within the master, a processor need only serve a single interface to the bus system, it can operate with maximum speed, in which case the interface effects an adaptation to different speeds on the bus system. In this connection, the speeds and the time points of the processor and the bus system are independent of each other, so that the master-processor data, which are fast as compared with the bus system, can write data within a short time. The data are then transferred from the interface of the master gradually over the slow bus system. In corresponding manner, upon the reading, the speed is adapted in opposite direction from the or each slave to the master. Since the bus system is built up of a small number of physical connections, a total of only a few components is required. The programming of the master-slave system is furthermore particularly simple since the master processor need serve only one interface to the bus system. An expansion of the system by further subunits is limited merely by the number of addresses which can be represented. Upon the use of a parallel address bus with a number of n lines, $2^n$ addresses can be represented in a binary system and thus $2^n$ slaves can be connected to the bus system.

BRIEF DESCRIPTION OF THE DRAWINGS

One embodiment of the invention will now be explained in further detail with reference to the drawing. In the drawing.

DETAILED DESCRIPTION OF THE INVENTION

Figure 1:
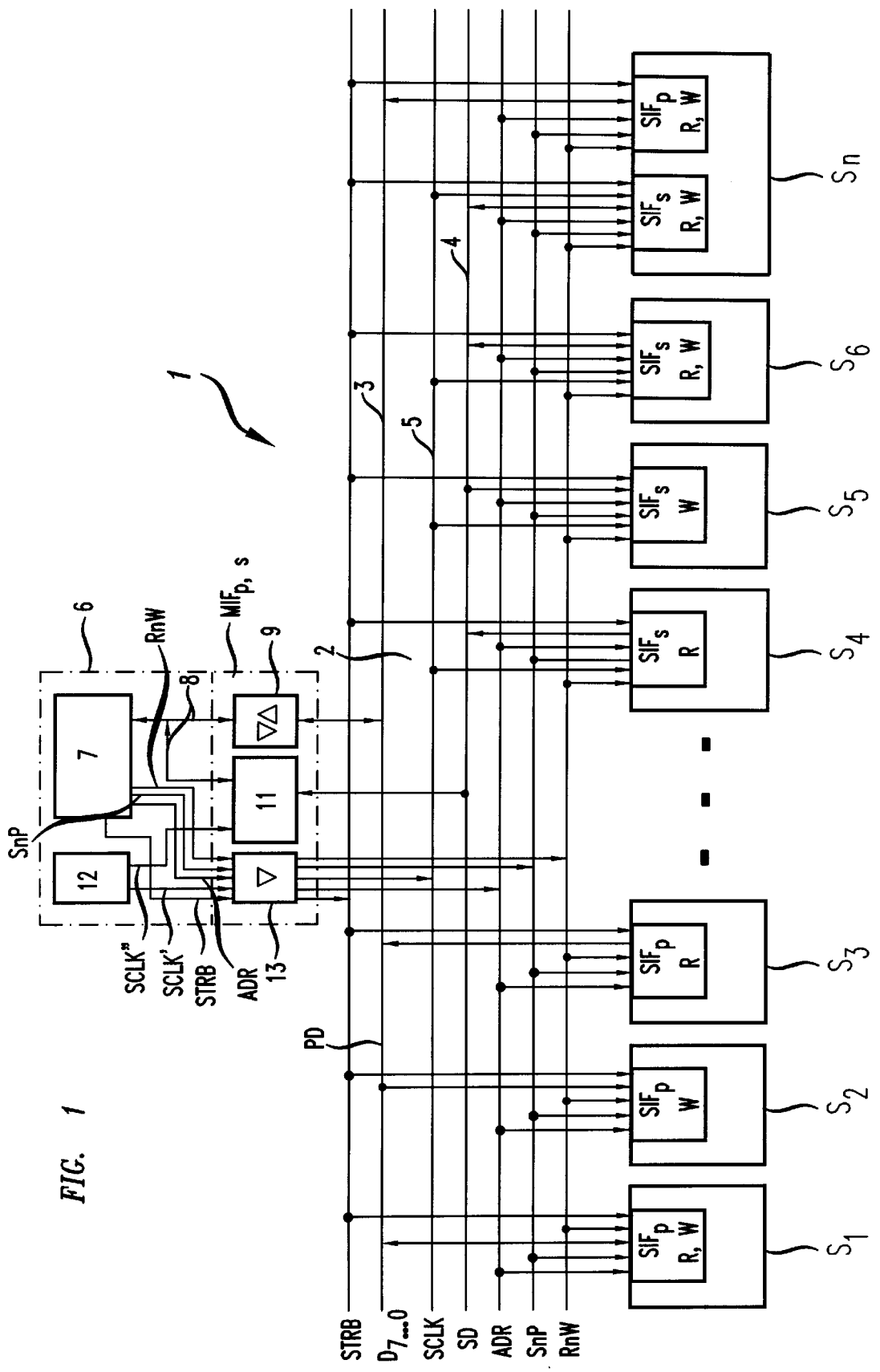
FIG. 1 shows diagrammatically a bus system for the transfer of data within a master-slave system having a parallel data bus and a serial data bus.

Parts corresponding to each other have been provided with the same reference numerals in all figures.

FIG. 1 shows in a master-slave system 1 a bus system 2 which is built up of a parallel data bus 3 and a synchronous serial data bus 4. A clock signal line 5 for a clock signal (serial clock) SCLK is associated with the serial data bus 4. The parallel data bus 3 serves for the transfer of parallel data PD and is built up from eight data lines $D_{7 \ldots 0}$ in the embodiment shown. The serial data bus 4 serves for the transfer of serial data SD. The data transfer takes place either in parallel in the form of eight (8) bits simultaneously on the eight data lines $D_{7 \ldots 0}$ of the parallel data bus 3 or serially in the form of eight (8) bits one after the other on the data line 4 of the serial data bus 4, 5.

The master 6 of the master-slave system comprises a processor 7 and an internal parallel 8 bus of its own, having at least eight and preferably sixteen or thirty-two data lines. For the coupling of the internal data bus 8 of the master 6 to the bus system 2, the master has an interface $MIF_{p,s}$. The internal data bus 8 of the master 6 is connected, on the one hand, via a bidirectional buffer 9 of the this interface $MIF_{p,s}$, to the parallel data bus 3. On the other hand, it is connected via a converter 11 of the interface $MIF_{p,s}$ for the conversion of one data form into the other data form to the serial data bus 4. Within the master 6 there are arranged so-called FIFO storages (first in, first out), not shown in detail, which are customarily formed by flip-flops. The FIFO's have an input side and an output side, as well as a number of storage cells. On the output side, data can be read out of the storage cells, but only in the sequence in which they were written on the input side. The speeds and times of the reading and writing on the internal data bus 8 on the one hand and on the bus system 2 on the other hand are independent of each other. In this way, the fast processor 7 of the master 6 can, within a short time, write data which are then written gradually by the control of the master interface $MIF_{p,s}$ over the comparatively slow bus system 2. The adaptation of the speed in the reverse direction takes place in corresponding manner.

In contradistinction to the master 6, which has only one interface $MIF_{p,s}$ and to the parallel data bus 3, as well as to the serial data bus 4 of the bus system 2, each slave $S_{1 \ldots n}$ has an interface $SIF_{p,s}$ to the parallel data bus 3 or to the serial data bus 4. Furthermore, a slave $S_{1 \ldots n}$ can have both a parallel interface $SIF_p$ and a serial interface $SIF_S$. Furthermore, the data transfer from the parallel data bus 3 to a slave $S_{1 \ldots 3}$ with parallel interface $SIF_p$ can take place bidirectionally or unidirectionally. In the case of unidirectional transfer of parallel data PD, parallel data PD can, from the standpoint of the master 6, either be written to a slave $S_2$ or read from a slave $S_3$. Similarly, the transfer of serial data SD can take place bidirectionally or unidirectionally from the serial data bus 4 to the slaves $S_{4 \ldots n}$ with serial interface $SIF_S$. In the case of serial data transfer, the clock signal SCLK is transferred to each slave $S_{4 \ldots n}$ with serial interface $SIF_S$ in addition via the signal line 5. For this purpose, a clock signal SCLK' is produced in the master 6 by a clock generator 12, this clock signal being conducted over a unidirectional buffer 13 and being applied as clock signal SCLK to the signal line 5.

Serial read data R from the slaves $S_4$ and $S_n$ are converted in the converter 11 into parallel data and fed, via the internal data bus 8, to the microprocessor 7 for further processing. In similar manner, parallel data produced by the processor 7 of the master 6 and intended to be fed to the slaves $S_5$ and/or $S_n$ are first of all converted into serial data in the converter 11. For the converting of the data from one type of transfer to the other type of transfer, a clock signal SCLK" produced in the clock generator 12 is directly fed to the converter 11.

Figure 2:
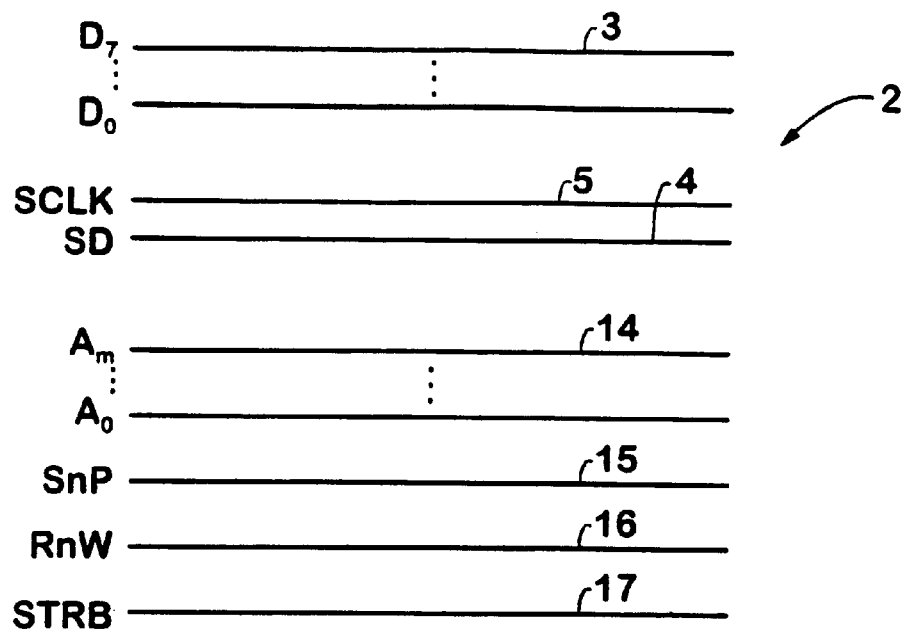
FIG. 2 shows diagrammatically the bus system of FIG. 1, with a plurality of data lines and control lines.

FIG. 2 shows the bus system 2 with a number of control lines for the addressing and determining of the kind of transfer during a bus cycle. In addition to the parallel data bus 3 having the data lines $D_{7 \ldots 0}$, an address bus 14 having a plurality of address lines $A_{m \ldots 0}$ for the addressing of the slaves $S_{1 \ldots n}$ is provided, the number of address lines $A_m \ldots A_0$ being determined in accordance with the equation $n=2^{m+1}$ in which n is the number of slaves $S_{1 \ldots n}$. For the determination of the manner of transfer of the data, a first control line 15 and a second control line 16 are provided. In this connection, a control signal SnP (serial, not parallel) conducted over the control line 15 indicates whether the data are transferred in serial or in parallel form. A control signal RnW (read, not write) conducted over the control line 15 indicates whether, from the standpoint of the master 6, data are being received by the slave $S_n$ or sent to it. The control signals SnP and RnW are fed in digital form as HIGH or LOW level via the control lines 15 and 16 respectively. A control line 17 serves for the transfer of a strobe signal STRB for a bus cycle.

In the embodiment shown, "not" is indicator for the LOW level, so that the signal level SnP=1 is associated with a serial port and the signal level SnP=0 with a parallel port. In similar manner, the signal level RnW=1 is associated with a read port and the signal level RnW=0 with a write port, so that a slave $S_n$ which is addressed over the address bus 14 unambiguously determines by the combination of the signal levels SnP and RnW. Thus the signal combination SnP, RnW=0.0 defines a write access to a parallel port, while the combination SnP,RnW=0.1 defines a read access to a parallel port. A write access to a serial port is determined by the signal combination SnP, RnW=1.0.

Figure 3:
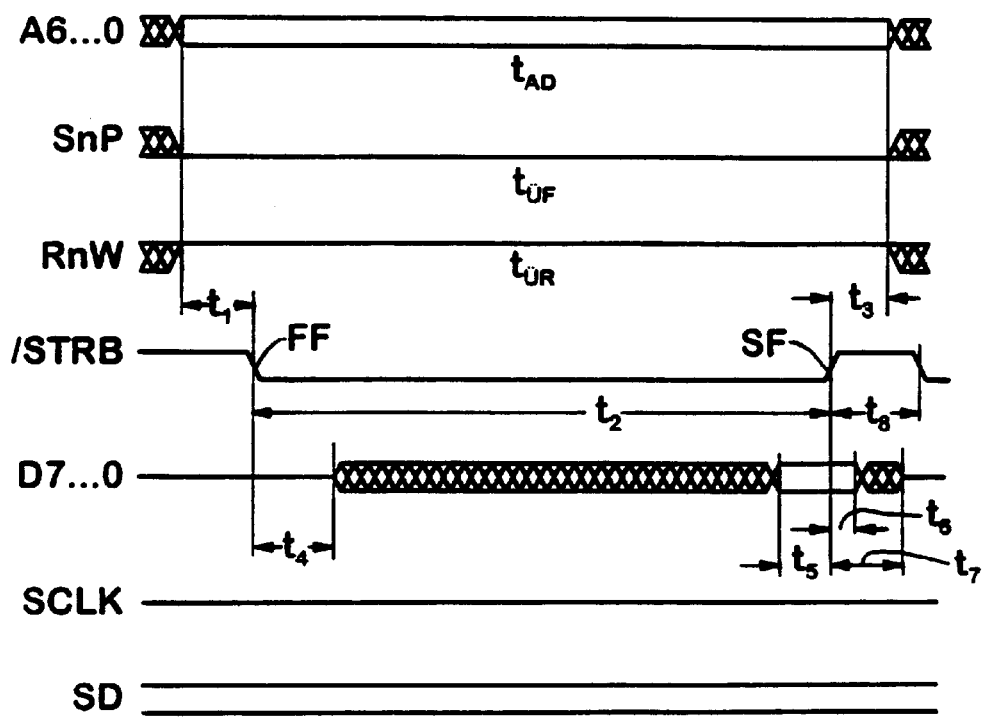
FIG. 3 shows a bus cycle with parallel read access.
Figure 4:
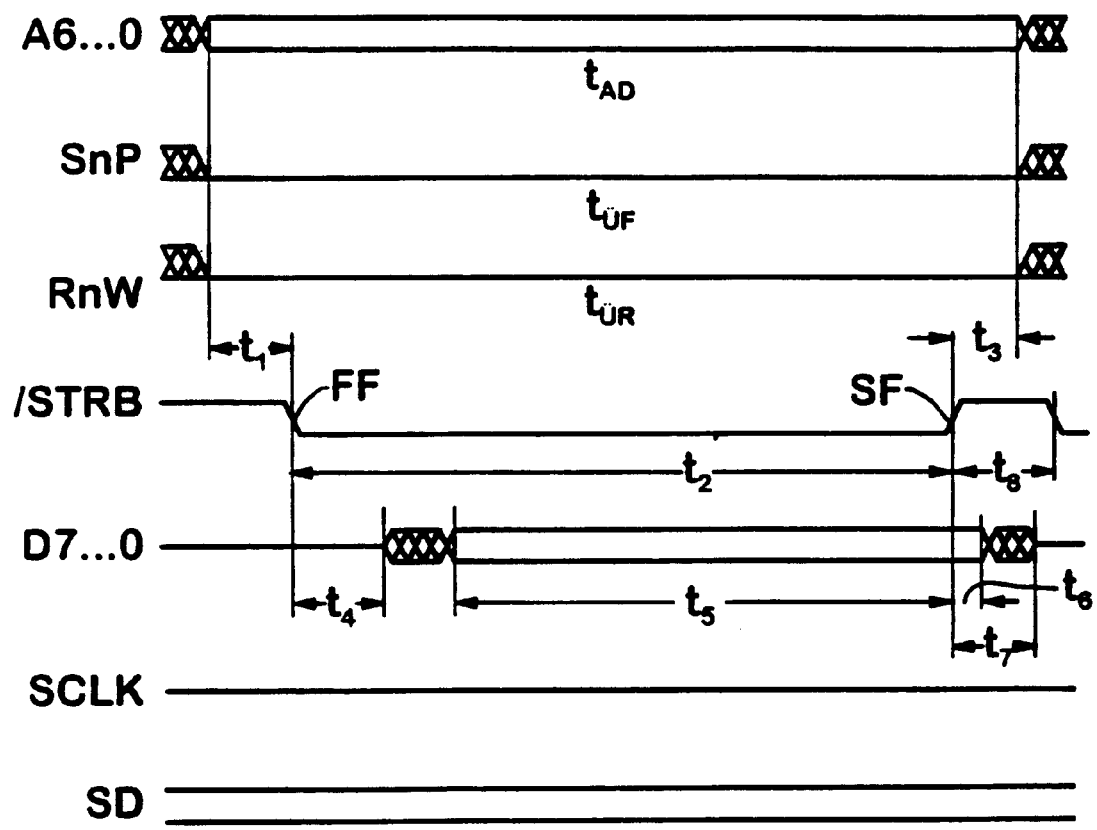
FIG. 4 shows another bus cycle with parallel write access.
Figure 5:
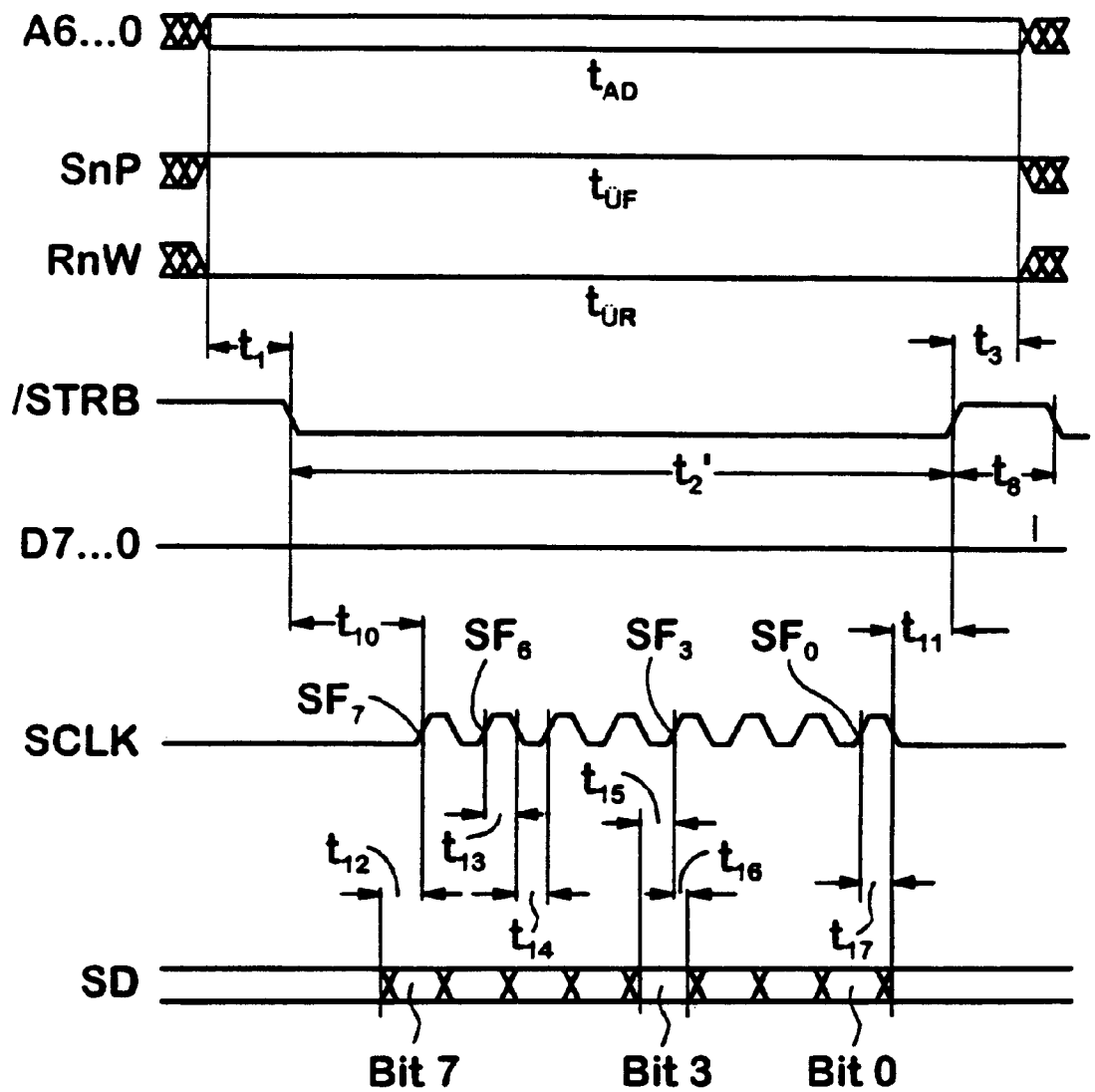
FIG. 5 furthermore shows a bus cycle with serial write access.

Such bus cycles are shown in FIGS. 3 to 5. FIG. 3 shows a bus cycle which is characteristic for a parallel read access, while FIGS. 4 and 5 shows a bus cycle which is characteristic for a parallel write access for a bus cycle which is characteristic for a serial write access. In accordance with FIG. 3, the control signal SnP for the type of transfer is set at LOW for a parallel read access in the case of an address selected over the address bus 14 having a cycle time $t_{AD}$, while the control signal RnW' for the direction of transfer is set at HIGH. The cycle times $t_{ÜF}$ and $t_{ÜR}$ for the control signals SnP and RnW respectively correspond to the cycle time $t_{AD}$. By means of the strobe signal STRB, the data transfer of the bus system 2 with respect to time is determined. In this connection, the making available of the data, for instance from the addressed slave $S_3$ with parallel interface $SIF_p$, takes place on the parallel data bus 3 as a result of the falling edge FF of the strobe signal STRB, while, after a pulse time $t_2$ the taking over of data from the parallel data bus 3, in this case by the master 6, takes place with the rising edge SF of the strobe signal STRB. For this, the time $t_1$ establishes a minimum time for a stable state of the control signals SnP and RnW as well as of the signal level on the address bus $A_{6 \ldots 0}$. after the expiration of which the falling edge FF of the strobe signal STRB can come. The making available of the data PD and the related driving of the parallel data lines $D_{7 \ldots 0}$ of the parallel date bus 3 by the slave $S_3$ commences at the earliest after a time $t_4$. In this connection, the signal level on the address bus $A_{6 \ldots 0}$, consisting here of seven address lines, can be either HIGH or LOW. Outside of the cycle times $t_{AD}$, $T_{ÜF}$, $t_{ÜR}$, the signal level of the address bus $A_{6 \ldots 0}$ and the control signals SnP and RnW can be in an undetermined state.

Although the data PD on the parallel date bus with the data lines $D_{7 \ldots 0}$ need not have a specific state during the entire pulse time $t_2$ of the strobe signal STRB, they must be stable for a period of time around the rising edge SF formed of a set-up time $t_5$ and a hold time $t_6$. The time $t_3$ indicates the difference in time between the rising edge SF of the strobe signal STRB and the end of the cycle times $t_{AD}$, $t_{ÜF}$ and $t_{ÜR}$. A period of time $t_7$ determines when, at the latest, after the rising edge SF, the making available of the data PD and the related driving of the parallel data lines $D_{7...0}$ of the parallel data bus 3 must be at an end. A period of time $t_8$ determines when at the earliest after the rising edge SF the falling edge FF of the strobe signal STRB belonging to the following bus cycle may occur. By the periods of time $t_4$, $t_7$ and $t_8$ assurance is had that only the slave $S_3$ addressed drives the signal level on the parallel data lines $D_{7...0}$. Thus, collisions with a slave at $S_{1...n}$ or the master 6 which has driven these data lines $D_{7...0}$ in the preceding parallel bus cycle or drives them in the following parallel bus cycle are excluded. The clock signal SCLK is a constant LOW over the entire parallel read cycle. On the serial data bus 4, the signal SD can be a constant HIGH or LOW. Upon the parallel read cycle or read access, the master 6 controls and drives the address bus $A_{6...0}$ as well as the control signals SnP and RnW. The master 6 furthermore assumes the control of the strobe signal STRB. The slave $S_3$ addressed drives the data lines $D_{7...0}$ of the parallel data bus 3. Thus, the sum of the times $t_1$ to $t_3$ indicates the cycle times $t_{AD}$, $t_{ÜF}$, $t_{ÜR}$.

The parallel write cycle or write access in accordance with FIG. 4 differs from the parallel read cycle in accordance with FIG. 3 substantially with respect to the division of the role between master 6 and slaves $S_{1...n}$. The making available of the data, here by the master 6, on the parallel data bus 3 takes place again after the falling edge FF of the strobe signal STRB, while the taking over of the data from the parallel data bus 3, here by the slave $S_2$, takes place with the rising edge SF of the strobe signal STRB. Within a period of time around the rising edge SF formed by a set-up time t5 and a hold time t6, the data supplied by the master 6 must be valid so that, upon the parallel write cycle, a specific data transfer can take place from the parallel data bus 3 to the slave $S_2$. While the control signal SnP upon the parallel write cycle is again set at LOW, upon the parallel write cycle, contrary to the parallel read cycle, the control signal RnW is set at LOW.

In the parallel write cycle or write access in accordance with FIG. 5, the control signal SnP is set at HIGH while the control signal RnW is again set at LOW. The strobe signal STRB differs from a parallel cycle or access by the pulse time $t'_2$, which is determined in the serial write cycle by the length in time of a transferred byte having eight (8) bits $BIT_{7...0}$. Upon the serial data transfer, i.e. both upon serial reading and serial writing, a clock signal SCLK (serial clock) having eight rising and eight falling edges is set and transferred together with the serial data SD. Upon the first rising edge $SF_7$ of the clock signal SCLK, the value or the datum SD (logical 0 or logical 1) on the serial data bus 4 is associated with bit 7. While $t_{10}$ indicates a period of time after the falling edge FF of the strobe signal STRB after which at the earliest the activity of the clock signal SCLK starts, $t_{11}$ indicates a period of time before the rising edge FF of the strobe signal STRB by the end of which the activity must be completed. A period of time $t_{12}$ establishes as from when the signal level on the serial data bus 4 may change. The periods of time $t_{13}$ and $t_{14}$ determine the pulse widths of the clock signal SCLK. The second rising edge $SF_6$ is associated with bit 6 of the serial value SD. An analogous association takes place with respect to the other bits up to bit 0, with which the rising edge $SF_0$ of the clock signal SCLK is associated. Specific set-up times $t_{15}$ and hold times $t_{16}$ for the serial data SD with respect to the rising edge SF of the clock signal SCLK are indicated by way of example for bit 3 in the drawing. A period of time $t_{17}$ describes as from when the signal level on the serial data bus 4 must again be constant. During the serial write or read access, the data lines $D_{7...0}$ of the parallel data bus 3 are not driven.

The bus system 4 permits the permanent transfer of digital data PD, SD for the setting and verification of condition of very different functional subunits (master 6 and slaves $S_{1...n}$) within a (not shown) high-frequency transmission and high frequency receiving unit SRFU (Single Carrier Radio Frequency Unit) of a base station BTS (Base Transceiver Station) for mobile communication in accordance with GSM standard (Global System for Mobile Communication). Within such a unit, the bus system 2 forms a transfer path for control and status data. In this connection, the subunits or slaves $S_{1...n}$ may, in a manner not described in detail, be on different circuit boards, in which case, the slaves $S_{1...n}$ can be connected directly, and thus without additional circuits for the converting of the manner of transfer to the bus system 2.

| List of Reference Numerals | |
| --- | --- |
| 1 | Master-slave system |
| 2 | Bus system |
| 3 | Parallel data bus |
| 4 | Serial data bus |
| 5 | Clock signal line |
| 6 | Master |
| 7 | Processor |
| 8 | Internal parallel data bus |
| 9 | Bidirectional buffer |
| 11 | Converter |
| 12 | Clock generator |
| 13 | Unidirectional buffer |
| 14 | Address bus |
| 15–17 | Control line |
| $A_{m...0}$ | Address lines |
| $D_{7...0}$ | Parallel data lines |
| FF | Falling edge |
| PD | Parallel data |
| $MIF_{p,s}$ | Master interface |
| RnW | Control signal / read, not write |
| $S_{1...n}$ | Slave |
| SnP | Control signal / serial, not parallel |
| SCLK | Clock signal / serial clock |
| SD | Serial data |
| STRB | Strobe signal |
| SF | Rising edge |
| $SIF_{p,s}$ | Parallel or serial slave interface |
| $t_n$ | Bus cycle times |

The invention claimed is:

1. A bus system for transferring data, comprising:
   a master having a processor that communicates using an internal parallel bus, a bus interface to the bus system, and a FIFO that provides communications between the internal parallel bus and the bus interface;
   a plurality of slaves;
   a parallel data bus interconnecting the master and at least a first slave, the first slave being one of the plurality of slaves;
   a serial data bus interconnecting the master and at least a second slave, the second slave being one of the plurality of slaves; and
   a first control line communicating a first control signal from the master to the plurality of slaves specifying the manner of data transfer.

2. The bus system of claim 1, wherein the first control signal specifies which of the parallel data bus and the serial data bus is to be used to transfer data.

3. The bus system of claim 1, wherein the first control signal specifies a direction of data transfer.

4. The bus system of claim 1, wherein the first slave is connected to the master by the serial data bus.

5. The bus system of claim 1, wherein the master comprises a converter that converts serial data into parallel data and parallel data into serial data, the converter being connected to the serial bus.

6. A bus system for transferring data, comprising:

a master having a converter that converts serial data into parallel data and parallel data into serial data, a processor that communicates using an internal parallel bus, a bus interface to the bus system, and a FIFO that provides communications between the internal parallel bus and the bus interface;

a plurality of slaves;

a parallel data bus interconnecting the master and the plurality of slaves;

a serial data bus interconnecting the converter and the plurality of slaves;

a first control line communicating a first control signal from the master to the plurality of slaves specifying which of the parallel data bus and the serial data bus is to be used to transfer data; and a second control line communicating a second control signal from the master to the plurality of slaves specifying a direction of data transfer.

* * * * *